(12) United States Patent
Uchida

(10) Patent No.: US 9,769,376 B2
(45) Date of Patent: Sep. 19, 2017

(54) IMAGING DEVICE, IMAGING DEVICE BODY, AND LENS BARREL

(71) Applicant: FUJIFILM Corporation, Tokyo (JP)

(72) Inventor: Akihiro Uchida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/406,760

(22) Filed: Jan. 15, 2017

(65) Prior Publication Data

US 2017/0126958 A1 May 4, 2017

Related U.S. Application Data

(63) Continuation of application No. PCT/JP2015/074044, filed on Aug. 26, 2015.

(30) Foreign Application Priority Data

Sep. 3, 2014 (JP) ................. 2014-178788

(51) Int. Cl.
| | |
|---|---|
| *H04N 5/232* | (2006.01) |
| *G02B 7/28* | (2006.01) |
| *G02B 5/00* | (2006.01) |
| *H04N 5/225* | (2006.01) |
| *H04N 5/235* | (2006.01) |

(52) U.S. Cl.
CPC ......... *H04N 5/23212* (2013.01); *G02B 5/005* (2013.01); *G02B 7/28* (2013.01); *H04N 5/2254* (2013.01); *H04N 5/2351* (2013.01); *H04N 5/2353* (2013.01); *H04N 5/23293* (2013.01)

(58) Field of Classification Search
None
See application file for complete search history.

(56) References Cited

U.S. PATENT DOCUMENTS

| 7,099,555 B2 | 8/2006 | Onuki et al. |
| 7,911,527 B2 | 3/2011 | Pan |

FOREIGN PATENT DOCUMENTS

| JP | H10268382 | 10/1998 |
| JP | 2000338387 | 12/2000 |

(Continued)

OTHER PUBLICATIONS

"Written Opinion of the International Searching Authority of PCT/JP2015/074044", mailed on Nov. 24, 2015, with English translation thereof, pp. 1-7.

*Primary Examiner* — Stephen Coleman
(74) *Attorney, Agent, or Firm* — Jiang Chyun Intellectual Property Office

(57) ABSTRACT

There is provided an imaging device that includes an APD filter, and can accurately perform the determination of an imaging exposure and the detection of a focus position together.

An imaging exposure is determined using a corrected diaphragm value (T number) obtained by correcting a diaphragm value on the basis of optical characteristics of the APD filter and an imaging diaphragm, which is determined during the determination of the imaging exposure, is set. After that, a search interval SD, by which a focus lens is moved for the time of auto-focusing, is determined using a diaphragm value (F number), which is not yet corrected, without using the corrected diaphragm value (T number). The search interval SD is set to a value that is calculated by dividing the product of the depth D of focus and a predetermined value C by an image plane movement coefficient k.

14 Claims, 16 Drawing Sheets

(56) References Cited

FOREIGN PATENT DOCUMENTS

| | | |
|---|---|---|
| JP | 2005062732 | 3/2005 |
| JP | 2005062733 | 3/2005 |
| JP | 2005208526 | 8/2005 |
| JP | 2009048136 | 3/2009 |
| JP | 2011248161 | 12/2011 |

IMAGING DEVICE, IMAGING DEVICE BODY, AND LENS BARREL

CROSS-REFERENCE TO RELATED APPLICATION

This application is a Continuation of PCT International Application PCT/JP2015/074044 filed on 26 Aug. 2015, which claims priority under 35 USC 119(a) from Japanese Patent Application No. 2014-178788 filed on 3 Sep. 2014. The above application is hereby expressly incorporated by reference, in its entirety, into the present application.

BACKGROUND OF THE INVENTION

1. Field of the Invention

The present invention relates to an imaging device, an imaging device body, and a lens barrel that include an apodization filter.

2. Description of the Related Art

There is known an imaging device that includes an apodization filter (hereinafter, referred to as an APD filter) having optical characteristics in which light transmittance is reduced as a distance from an optical axis is increased (see JP2005-062733A corresponding to U.S. Pat. No. 7,099,555). The APD filter reduces the amount of light around only a blurred image (spotlight blurring or the like), which is out of focus, without reducing the amount of light around an image plane. Accordingly, the APD filter realizes a beautiful blur by applying gradation to the profile of a blurred image.

Since the APD filter has the above-mentioned optical characteristics, a light-reducing effect becomes great as the diaphragm value (F number) approaches an open value. For this reason, in JP2005-062733A, a substantial diaphragm value (T number), which is obtained by correcting a diaphragm value on the basis of the optical characteristics of the APD filter, is obtained and the determination of an imaging exposure (an imaging diaphragm value and an imaging shutter speed) is performed on the basis of the T number.

Further, an imaging device, such as a digital camera, has an auto-focusing function. Auto-focusing is a method that moves a focus lens by a predetermined search interval and detects a focus position on the basis of high-frequency components of an imaging signal obtained for each search interval. JP2009-048136A (corresponding to U.S. Pat. No. 7,911,527) proposes a method of determining a search interval on the basis of the depth of focus, which is a parameter depending on a diaphragm value (F number), in the auto-focusing.

A method of determining the search interval of the auto-focusing on the basis of the depth of focus as disclosed in JP2009-048136A is also considered in the imaging device including the APD filter disclosed in JP2005-062733A. That is, since the determination of an imaging exposure is performed as described above in the imaging device including the APD filter, the diaphragm value (F number) is corrected to a substantial diaphragm value (T number). Accordingly, the depth of focus based on the T number is also used for the determination of the search interval. Since the T number is larger than the F number, the depth of focus, which is larger than the depth of focus obtained in a case in which the imaging device does not include the APD filter, is calculated in the imaging device including the APD filter. Accordingly, the search interval is determined as a large value.

However, since the APD filter is a kind of neutral density filter and actually does not change the depth of focus, the accuracy of detection of a focus position deteriorates due to an increase in the search interval. Since the T number becomes larger than the F number as approaching an open value, the accuracy of detection of a focus position deteriorates as the diaphragm value approaches the open value.

SUMMARY OF THE INVENTION

An object of the present invention is to provide an imaging device that includes an APD filter, and can accurately perform the determination of an imaging exposure and the detection of a focus position together, an imaging device body, and a lens barrel.

An imaging device of the present invention comprises a focus lens, an imaging element, a diaphragm, a photometric unit, an apodization filter, an imaging exposure determining unit, a focus position detecting unit, and a search interval determining unit. The imaging element photoelectrically converts an incident ray entering through the focus lens and outputs an imaging signal. The diaphragm changes the amount of the incident ray. The photometric unit performs photometry on the basis of the imaging signal. The apodization filter is disposed on a light path of the incident ray. The imaging exposure determining unit determines an imaging exposure on the basis of a photometric value obtained from the photometric unit. The imaging exposure determining unit determines the imaging exposure by using a corrected diaphragm value that is obtained by correcting a diaphragm value on the basis of optical characteristics of the apodization filter. The focus position detecting unit moves the focus lens by search intervals and detects a focus position by calculating a focusing evaluation value for each search interval on the basis of the imaging signal. The search interval determining unit determines the search interval on the basis of a depth of focus depending on the diaphragm value. The search interval determining unit determines the search interval by using a diaphragm value, which is not yet corrected.

Alternatively, an imaging device of the present invention comprises a focus lens, an imaging element, a diaphragm, a photometric unit, an apodization filter, an imaging exposure determining unit, a focus position detecting unit, and a search interval determining unit. The imaging element photoelectrically converts an incident ray entering through the focus lens and outputs an imaging signal. The diaphragm changes the amount of the incident ray. The photometric unit performs photometry on the basis of the imaging signal. The apodization filter is disposed on a light path of the incident ray. The imaging exposure determining unit determines an imaging exposure on the basis of a photometric value obtained from the photometric unit. The imaging exposure determining unit determines the imaging exposure by using a corrected diaphragm value, which is obtained by correcting a diaphragm value on the basis of optical characteristics of the apodization filter, in a case in which the apodization filter is disposed. The focus position detecting unit moves the focus lens by search intervals and detects a focus position by calculating a focusing evaluation value for each search interval on the basis of the imaging signal. The search interval determining unit determines the search interval on the basis of a depth of focus depending on the diaphragm value. The search interval determining unit determines the search interval by using a diaphragm value, which is not yet corrected in a case in which the apodization filter is disposed. It is preferable that the imaging device further comprises a filter detecting unit. The filter detecting unit detects whether or not the apodization filter is disposed on the light path. It is preferable that the imaging exposure determining unit determines whether or not to correct the diaphragm value on the basis of a detection result of the filter detecting unit.

The depth of focus depends on a diaphragm value and a diameter of a permissible circle of confusion that is determined depending on characteristics of the imaging element. It is preferable that the search interval determining unit determines the search interval on the basis of a condition in which a moving distance of an image plane depending on the movement of the focus lens corresponds to a value obtained by multiplying the depth of focus by a predetermined value. The predetermined value may be 1 and may be larger than 1. In a case in which the predetermined value is larger than 1, it is preferable that the focus position detecting unit detects the focus position by performing interpolation calculation on the basis of the focusing evaluation value. Further, it is preferable that that the imaging device further comprises a display unit that displays a distance range, in which focusing is performed, on the basis of the focus position and the depth of focus.

An imaging device body of the present invention comprises a lens barrel mounting portion, an imaging element, a photometric unit, an imaging exposure determining unit, a focus position detecting unit, and a search interval determining unit. A lens barrel including a focus lens, a diaphragm, and an apodization filter is mounted on the lens barrel mounting portion. The imaging element photoelectrically converts an incident ray entering from the lens barrel and outputs an imaging signal. The photometric unit performs photometry on the basis of the imaging signal. The imaging exposure determining unit determines an imaging exposure on the basis of a photometric value obtained from the photometric unit. The imaging exposure determining unit determines the imaging exposure by using a corrected diaphragm value, which is obtained by correcting a diaphragm value on the basis of optical characteristics of the apodization filter, in a case in which the mounting of the lens barrel including the apodization filter is detected. The focus position detecting unit moves the focus lens by search intervals and detects a focus position by calculating a focusing evaluation value for each search interval on the basis of the imaging signal. The search interval determining unit determines the search interval on the basis of a depth of focus depending on the diaphragm value. The search interval determining unit determines the search interval by using a diaphragm value, which is not yet corrected in a case in which the mounting of the lens barrel including the apodization filter is detected.

Alternatively, an imaging device body of the present invention comprises a lens barrel mounting portion, an imaging element, a photometric unit, an imaging exposure determining unit, a focus position detecting unit, and a search interval determining unit. A lens barrel including a focus lens, a diaphragm, and an apodization filter is detachably mounted on the lens barrel mounting portion. The imaging element photoelectrically converts an incident ray entering from the lens barrel and outputs an imaging signal. The photometric unit performs photometry on the basis of the imaging signal. The imaging exposure determining unit determines an imaging exposure on the basis of a photometric value obtained from the photometric unit. The imaging exposure determining unit determines the imaging exposure by using a corrected diaphragm value, which is obtained by correcting a diaphragm value on the basis of optical characteristics of the apodization filter, in a case in which the apodization filter is disposed. The focus position detecting unit moves the focus lens by search intervals and detects a focus position by calculating a focusing evaluation value for each search interval on the basis of the imaging signal. The search interval determining unit determines the search interval on the basis of a depth of focus depending on the diaphragm value. The search interval determining unit determines the search interval by using a diaphragm value, which is not yet corrected in a case in which the apodization filter is disposed. In addition, the optical characteristics are stored in the lens barrel. It is preferable that the imaging exposure determining unit acquires the optical characteristics from the lens barrel and corrects the diaphragm value.

It is preferable that the search interval determining unit determines the search interval on the basis of a condition in which a moving distance of an image plane depending on the movement of the focus lens corresponds to a value obtained by multiplying the depth of focus by a predetermined value, and acquires a moving magnification of the image plane to the movement of the focus lens from the lens barrel and determines the search interval.

A lens barrel of the present invention comprises a focus lens, a diaphragm, an apodization filter, and a base end portion. The diaphragm changes the amount of an incident ray. The apodization filter is disposed on a light path of the incident ray. The base end portion is mounted on an imaging device body. The imaging device body includes an imaging element, a photometric unit, an imaging exposure determining unit, a focus position detecting unit, and a search interval determining unit. The imaging element photoelectrically converts the incident ray and outputs an imaging signal. The photometric unit performs photometry on the basis of the imaging signal. The imaging exposure determining unit determines an imaging exposure on the basis of a photometric value obtained from the photometric unit. The imaging exposure determining unit determines the imaging exposure by using a corrected diaphragm value that is obtained by correcting a diaphragm value on the basis of optical characteristics of the apodization filter. The focus position detecting unit moves the focus lens by search intervals and detects a focus position by calculating a focusing evaluation value for each search interval on the basis of the imaging signal. The search interval determining unit determines the search interval on the basis of a depth of focus depending on the diaphragm value. The search interval determining unit determines the search interval by using a diaphragm value, which is not yet corrected.

Alternatively, a lens barrel of the present invention comprises a focus lens, a diaphragm, an apodization filter, and a base end portion. The diaphragm changes the amount of incident ray. The apodization filter is disposed on a light path of the incident ray. The base end portion is detachably mounted on an imaging device body. The imaging device body includes an imaging element, a photometric unit, an imaging exposure determining unit, a focus position detecting unit, and a search interval determining unit. The imaging element photoelectrically converts the incident ray and outputs an imaging signal. The photometric unit performs photometry on the basis of the imaging signal. The imaging exposure determining unit determines an imaging exposure on the basis of a photometric value obtained from the photometric unit. The focus position detecting unit moves the focus lens by search intervals and detects a focus position by calculating a focusing evaluation value for each search interval on the basis of the imaging signal. The search interval determining unit determines the search interval on the basis of a depth of focus depending on the diaphragm value. The imaging exposure determining unit determines the imaging exposure by using a corrected diaphragm value obtained by correcting a diaphragm value on the basis of optical characteristics of the apodization filter in a case in which the mounting of the lens barrel including the apodization filter is detected. The search interval determining unit determines the search interval by using a diaphragm value, which is not yet corrected.

According to the present invention, in a case in which the apodization filter is disposed on the light path of an incident ray, an imaging exposure is determined by using a corrected diaphragm value that is obtained by correcting a diaphragm value on the basis of the optical characteristics of the apodization filter, a search interval is determined by using a diaphragm value, which is not yet corrected. Accordingly, it is possible to accurately perform the determination of the imaging exposure and the detection of the focus position.

DESCRIPTION OF THE PREFERRED EMBODIMENTS

First Embodiment

Figure 1:
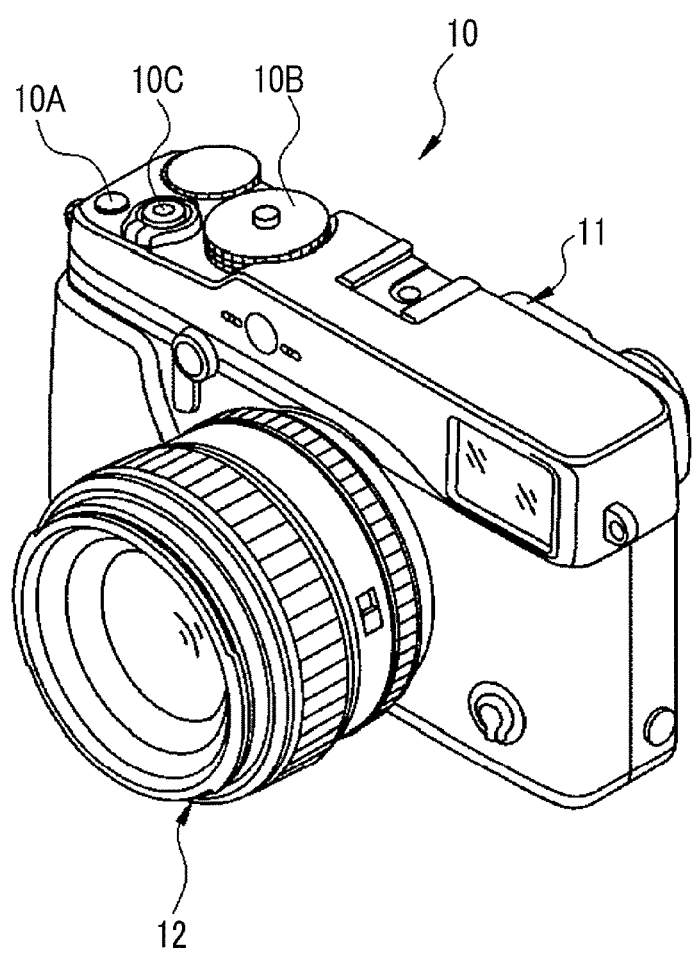
FIG. 1 is a perspective view of the appearance of an imaging device of a first embodiment.

An imaging device 10 of a first embodiment of the present invention is a lens-interchangeable imaging device. In FIG. 1, the imaging device 10 includes an imaging device body 11 and a lens barrel 12. The imaging device body 11 is provided with a power button 10A, a mode switching button 10B, and a shutter button 10C. The power button 10A is operated to turn on/off a power supply. The mode switching button 10B is operated to switch an operation mode. This operation mode includes a live view mode, a video imaging mode, a still image taking mode, an image playback mode, and the like. The live view mode is a mode in which an image is merely displayed in real time without being recorded, and is performed before a video is taken or a still image is taken. The imaging of a video and the taking of a still image are performed by the press of the shutter button 10C during the live view mode.

Figure 2:
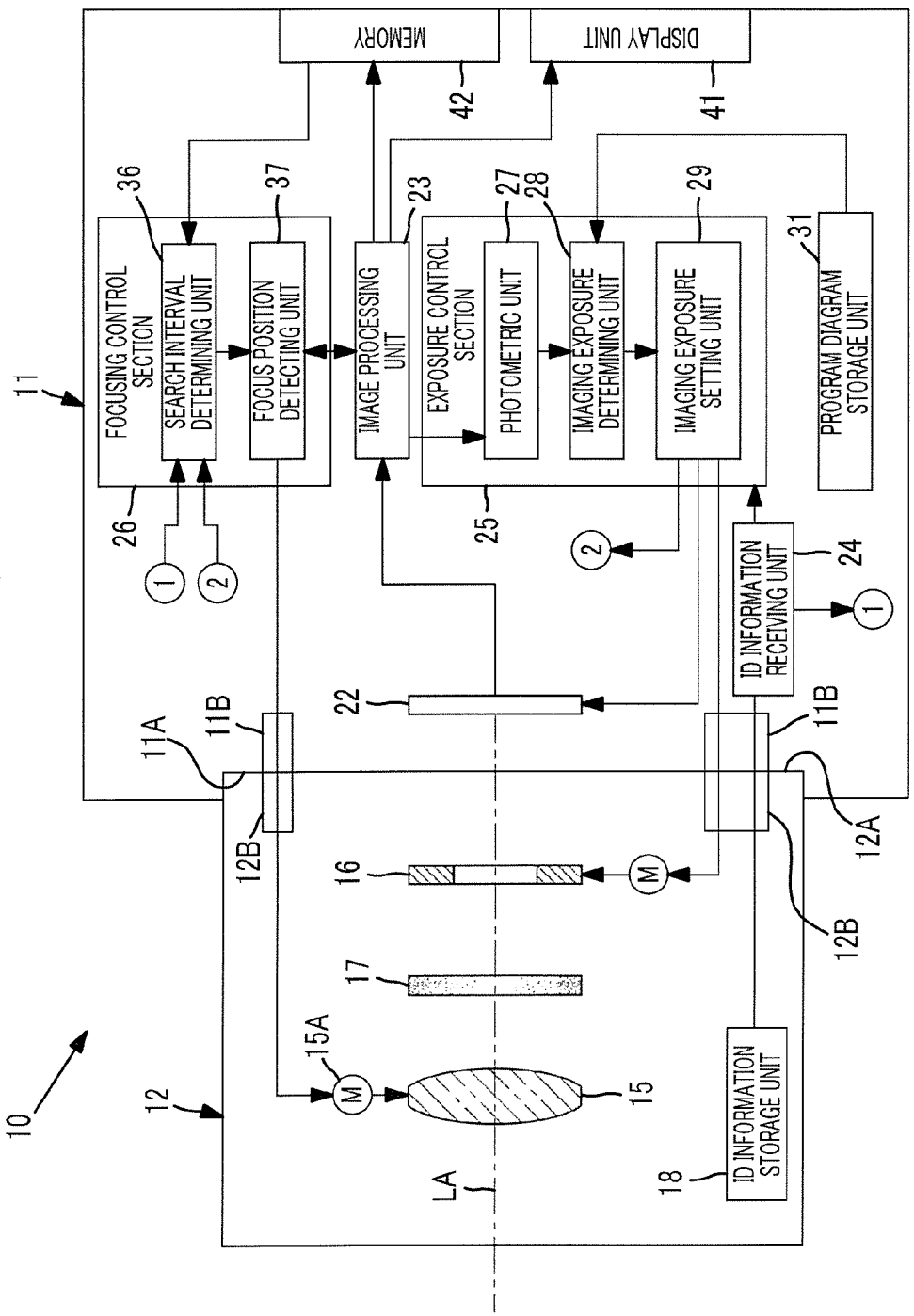
FIG. 2 is a block diagram showing the configuration of the imaging device of the first embodiment.

In FIG. 2, the imaging device body 11 is provided with a lens barrel mounting portion 11A. In the event that a base end portion 12A of the lens barrel 12 is mounted on the lens barrel mounting portion 11A, the imaging device body 11 and the lens barrel 12 are connected to each other. The lens barrel mounting portion 11A and the base end portion 12A are provided with electrical contacts 11B and 12B, respectively. The imaging device body 11 and the lens barrel 12 are electrically connected to each other through the electrical contacts 11B and 12B.

The lens barrel 12 is detachably mounted on the imaging device body 11. The lens barrel 12 includes a focus lens 15, a diaphragm 16, and an apodization (APD) filter 17. The focus lens 15, the APD filter 17, and the diaphragm 16 are disposed in this order toward the base end portion 12A from the side facing a subject, and are disposed on the same optical axis LA. Here, the optical axis LA corresponds to the light path of an incident ray entering from the subject. The focus lens 15 focuses light emitted from the subject and forms an image. The diaphragm 16 adjusts the amount of the incident ray.

Figure 3:
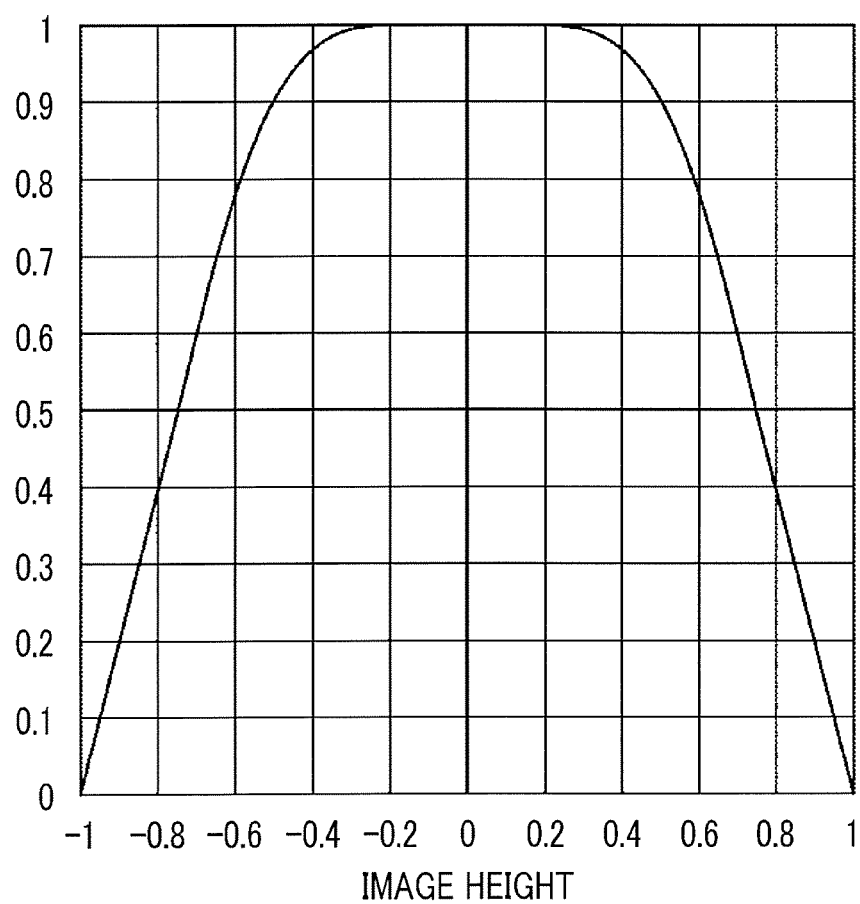
FIG. 3 is a view showing the optical characteristics of an APD filter.

As shown in FIG. 3, the APD filter 17 has optical characteristics in which light transmittance is reduced as a distance from the optical axis LA is increased (as an image height is increased). The APD filter 17 further reduces an incident ray as an image height is increased. For this reason, as the diaphragm value (F number) of the diaphragm 16 approaches an open value, a light-reducing effect of the APD filter 17 is increased. The F number is a value that depends on the effective diaphragm diameter of the diaphragm 16, and light transmittance in an effective diaphragm region is not considered for the F number. The T number is a substantial diaphragm value that is obtained in consideration of light transmittance P in the effective diaphragm region, and is generally expressed by Equation (1).

$$T = F/P^{1/2} \quad (1)$$

Figure 4:
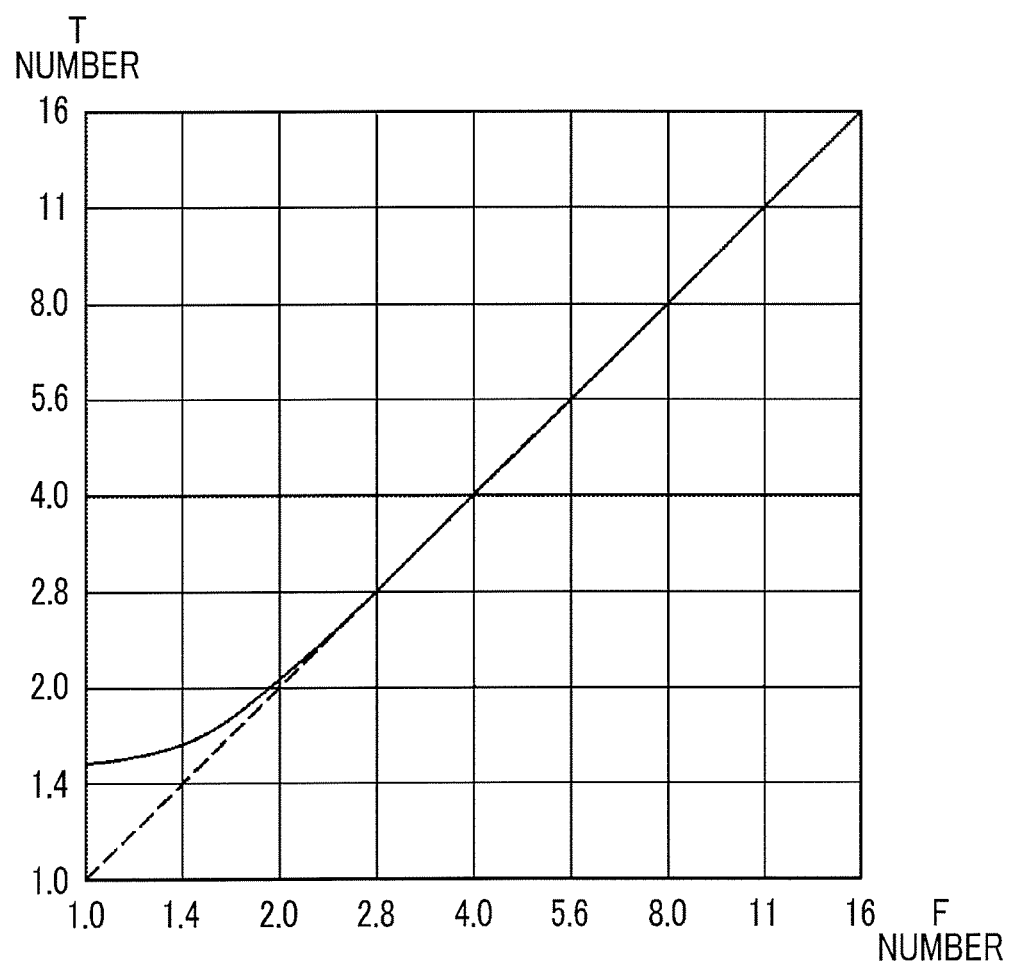
FIG. 4 is a view showing the correction of a diaphragm value based on the optical characteristics of the APD filter.

In the event that the light transmittance of the APD filter 17 is applied as the light transmittance P, a T number, which is to be obtained in consideration of the optical characteristics of the APD filter 17, is obtained. A relationship between the T number and the F number is represented by a curve (correction curve) shown in FIG. 4. The F number is corrected to the T number by using the correction curve. As the T number approaches an open value, the amount of correction is increased and a variation from the F number is increased.

The lens barrel 12 includes an ID (identification) information storage unit 18. The ID information storage unit 18 stores ID information that is used to specify the type of the lens barrel 12. An image plane movement coefficient k of the focus lens 15 and the type of the APD filter 17 are also specified by the ID information. The ID information, which is stored in the ID information storage unit 18, is sent to the imaging device body 11 through the electrical contacts 11B and 12B.

Figure 5:
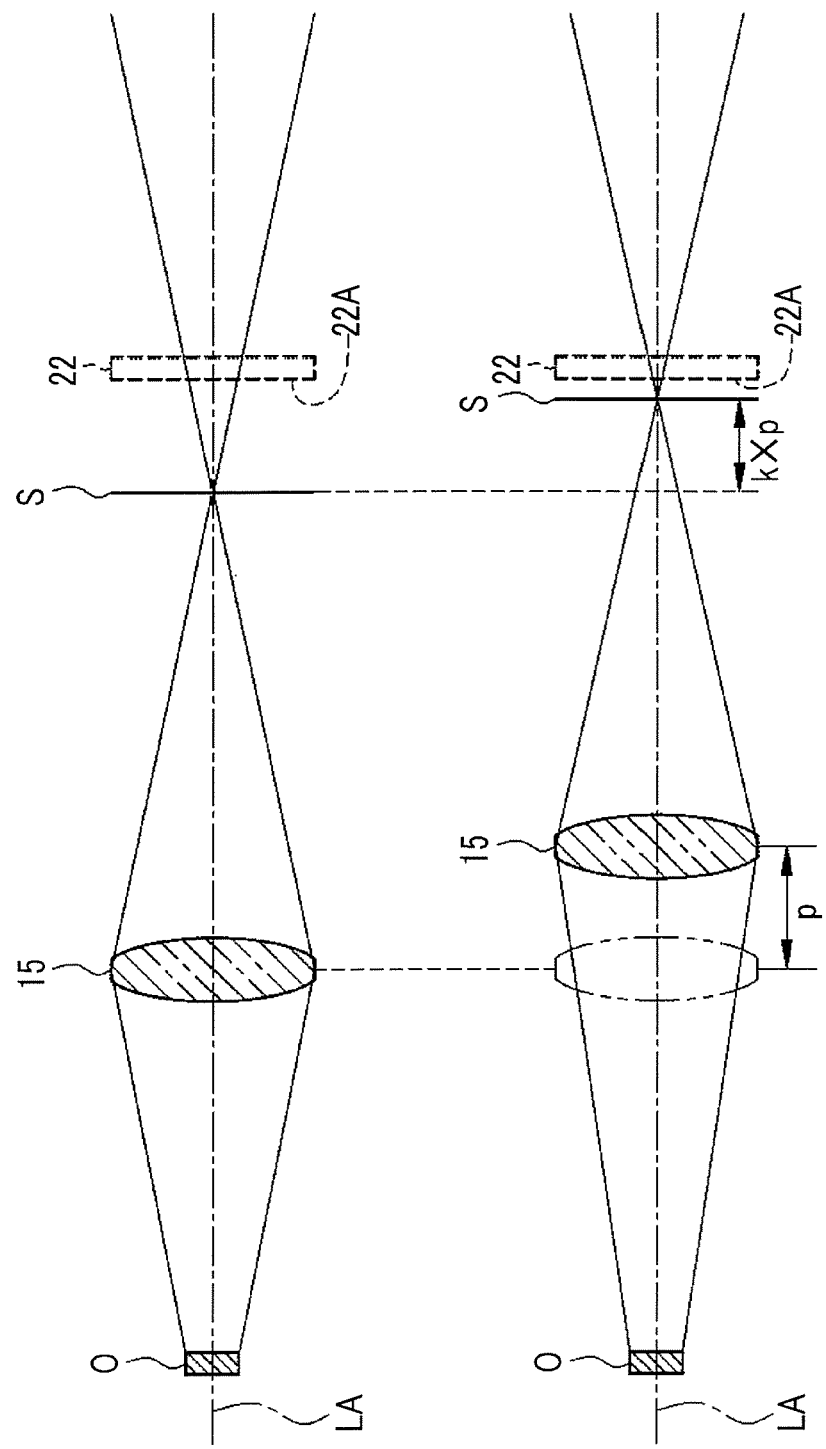
FIG. 5 is a view showing an image plane movement coefficient.

The image plane movement coefficient k will be described with reference to FIG. 5. Light emitted from a subject O forms an image on an image plane S by the focus lens 15. The image plane movement coefficient k is a ratio (moving magnification) of the moving distance of the image plane S to the moving distance of the focus lens 15. That is, the moving distance of the image plane S (image-plane moving distance) is "k×p" in a case in which the focus lens 15 is moved along the optical axis LA by p. The image plane movement coefficient k is a parameter that is used for the determination of a search interval of the focus lens 15 for the situation where a focusing operation for allowing the image plane S to correspond to an imaging surface 22A of an imaging element 22 by moving the focus lens 15 (auto-focusing operation) is performed by a focusing control section 26. The focus lens 15 is moved by the drive of a pulse motor 15A. The moving distance of the focus lens 15, which is obtained in the event that one pulse is input to the pulse motor 15A, is constant. The focusing control section 26 controls the moving distance of the focus lens 15 by controlling the number of pulses to be input to the pulse motor 15A.

The imaging device body 11 includes the imaging element 22, an image processing unit 23, an ID information receiving unit 24, an exposure control section 25, the focusing control section 26, a program diagram storage unit 31, a display unit 41, and a memory 42. The imaging element 22 photoelectrically converts an incident ray entering from the lens barrel 12, and outputs imaging signals to the image processing unit 23. The imaging element 22 is a CMOS (Complementary Metal Oxide Semiconductor) image sensor, and can control an electronic shutter speed.

The image processing unit 23 creates a photographed image from the imaging signals, and outputs the photographed image to the display unit 41 and the memory 42. The image processing unit 23 supplies brightness signals, which are obtained from the imaging signals by Y/C conversion or the like, to the exposure control section 25. Further, the image processing unit 23 calculates a focusing evaluation value from the imaging signal in accordance with a request from a focus position detecting unit 37 to be described below. The image processing unit 23 supplies the calculated focusing evaluation value to the focus position detecting unit 37. The display unit 41 displays the photographed image that is input from the image processing unit 23. The memory 42 stores the photographed image that is input from the image processing unit 23. The memory 42 stores the diameter δ of the permissible circle of confusion that is a parameter representing the characteristics of the imaging element 22.

The ID information receiving unit 24 receives the ID information, which is sent from the ID information storage unit 18, and specifies the type of the lens barrel 12, which is connected to the imaging device body 11, on the basis of the received ID information. Particularly, the ID information receiving unit 24 determines whether or not the APD filter 17 is included in the lens barrel 12 from the ID information, and supplies the result of determination to the exposure control section 25. The attachment/detachment of the lens barrel 12 substantially corresponds to whether or not the APD filter 17 is disposed on the light path. The ID information receiving unit 24 functions as a filter detecting unit that detects whether or not the APD filter 17 is disposed on the light path. Further, the ID information receiving unit 24 supplies information about the image plane movement coefficient k of the focus lens 15 to the focusing control section 26.

The exposure control section 25 receives the brightness signals supplied from the image processing unit 23. Furthermore, the exposure control section 25 receives information (filter presence/absence information) that relates to whether or not the APD filter 17 is disposed on the light path and is supplied from the ID information receiving unit 24.

The exposure control section 25 includes a photometric unit 27, an imaging exposure determining unit 28, and an imaging exposure setting unit 29. The photometric unit 27 calculates a photometric value on the basis of the brightness signals that are supplied to the exposure control section 25, and supplies the calculated photometric value to the imaging exposure determining unit 28. The imaging exposure determining unit 28 obtains an appropriate exposure value (EV) by performing predetermined calculation on the basis of the photometric value that is supplied from the photometric unit 27.

The imaging exposure determining unit 28 acquires the filter presence/absence information that is supplied to the exposure control section 25. The imaging exposure determining unit 28 selects one program diagram, which is used for the determination of an imaging exposure, from the program diagram storage unit 31 on the basis of the filter presence/absence information.

The imaging exposure determining unit 28 determines a set of an imaging diaphragm value and an imaging shutter speed on the basis of the EV, which is obtained by the calculation, by using the selected program diagram. The imaging exposure determining unit 28 supplies the determined imaging diaphragm value and the determined imaging shutter speed to the imaging exposure setting unit 29.

The imaging exposure setting unit 29 sets an imaging exposure by setting the imaging diaphragm value and the imaging shutter speed, which are determined by the imaging exposure determining unit 28, in the diaphragm 16 and the imaging element 22. The imaging exposure setting unit 29 supplies information about the set imaging diaphragm value to the focusing control section 26.

Figure 6:
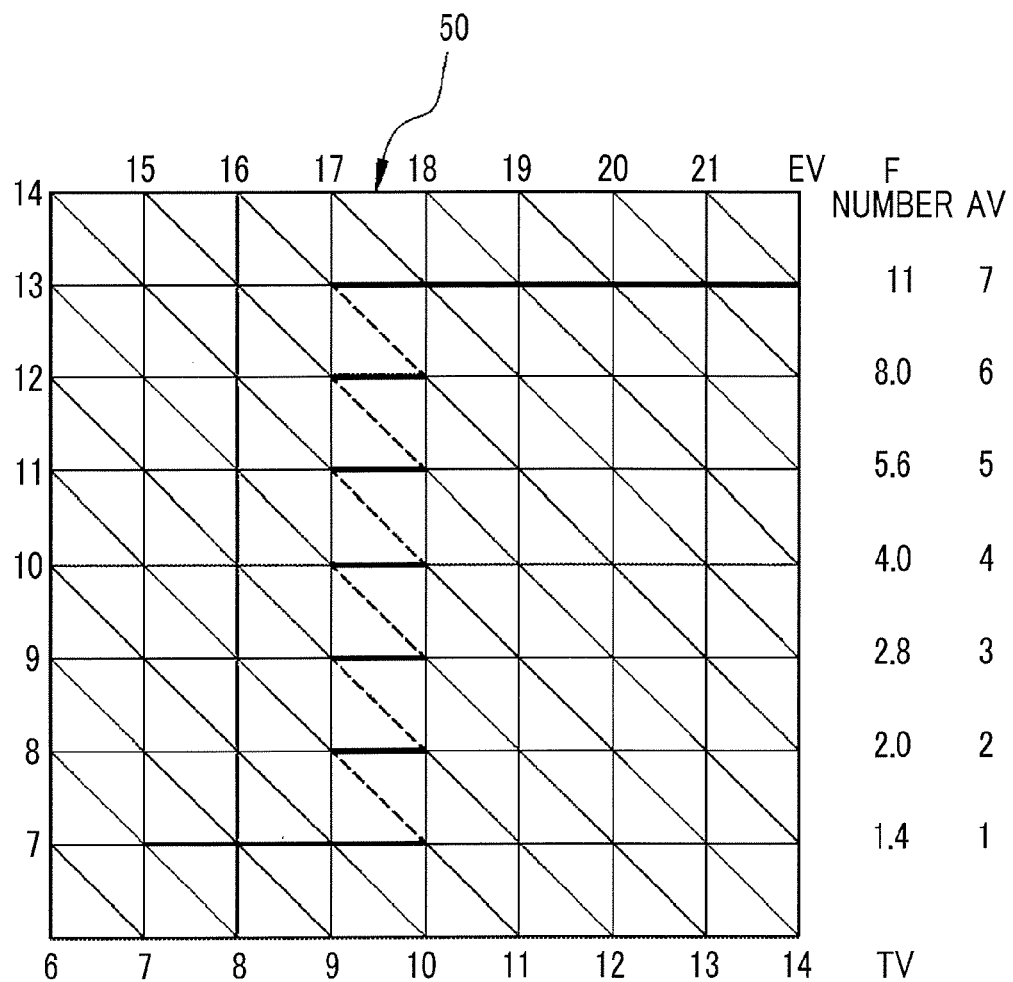
FIG. 6 is a view showing an example of a first program diagram.
Figure 7:
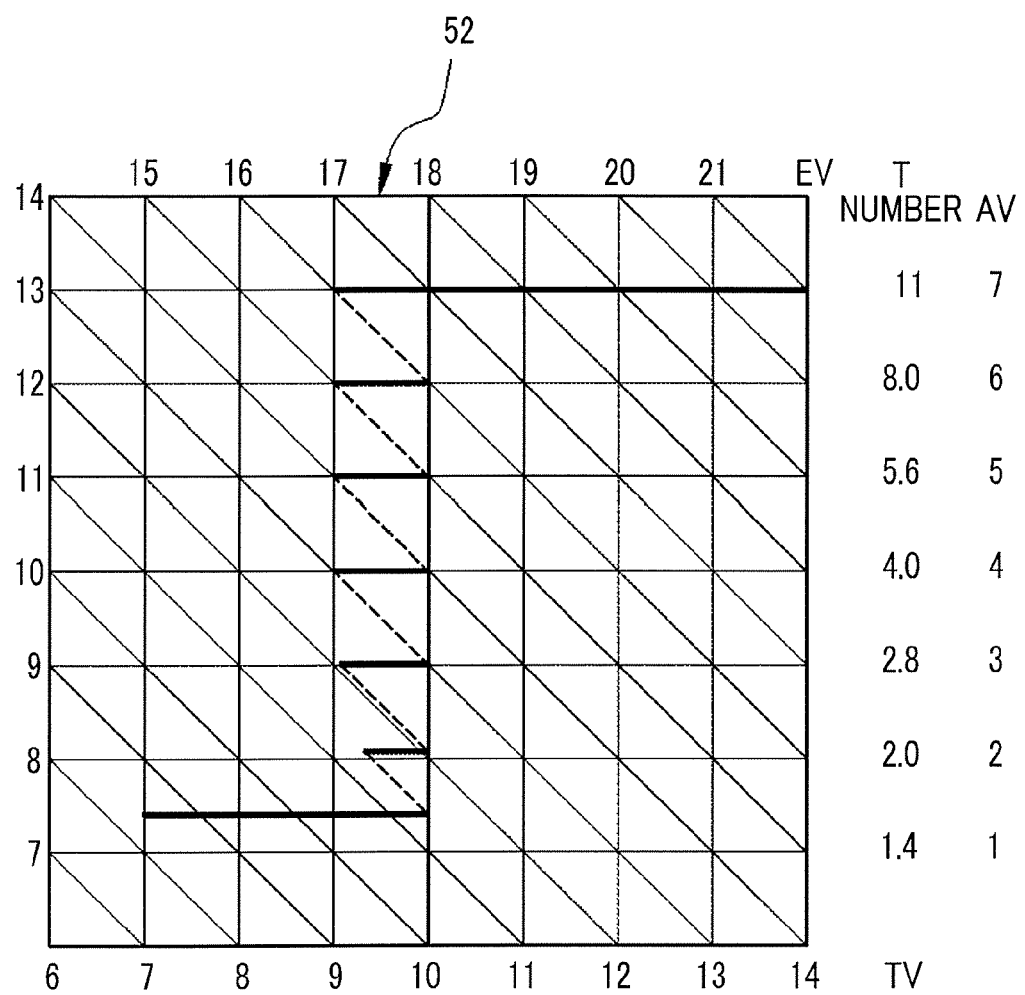
FIG. 7 is a view showing an example of a second program diagram.

The program diagram storage unit 31 stores a first program diagram 50 (see FIG. 6) and a second program diagram 52 (see FIG. 7). Each of the program diagrams 50 and 52 is expressed by AV (Aperture Value) and TV (Time Value) that satisfy an APEX (Additive system of Photographic EXposure) calculation equation (2).

$$EV=AV+TV \quad (2)$$

Here, AV corresponds to the imaging diaphragm value, and satisfies the relationship of Equation (3) together with the T number. Further, TV corresponds to the imaging shutter speed, and satisfies the relationship of Equation (4) together with the imaging shutter speed t (unit; sec.).

$$AV=2\times\log_2(T) \quad (3)$$

$$TV=-\log_2(t) \quad (4)$$

The first program diagram 50 is used in a case in which a lens barrel (not shown) not including the APD filter 17 is connected to the imaging device body 11. Since "T=F" is satisfied in a case in which the APD filter 17 is not present, a vertical axis of the first program diagram 50 represents an F number and AV corresponding to the F number.

The second program diagram 52 is used in a case in which the lens barrel 12 including the APD filter 17 is connected to the imaging device body 11. Since "T≠F" is satisfied in a case in which the APD filter 17 is present, a vertical axis of the second program diagram 52 represents a T number, which is a substantial diaphragm value, and AV corresponding to the T number.

Since a diaphragm value is corrected to a T number from an F number in FIG. 7, an interval of AVs of a multiple-stage portion is reduced and a plurality of sets of AVs and TVs correspond to one EV. Accordingly, the length of the program diagram in a TV direction is adjusted (reduced) so that one set of AV and TV corresponds to one EV. The adjustment of the length of the program diagram at the multiple-stage portion is performed by the adjustment of the position of a small end of the program diagram in the TV direction in this embodiment, but may be performed by the adjustment of the position of a large end of the program diagram in the TV direction.

The focusing control section 26 performs auto-focusing control. The focusing control section 26 includes a search interval determining unit 36 and the focus position detecting unit 37. The search interval determining unit 36 acquires the information about the imaging diaphragm value that is supplied from the imaging exposure setting unit 29 and information about the diameter δ of the permissible circle of confusion that is stored in the memory 42. Here, the information about the imaging diaphragm value, which is acquired by the search interval determining unit 36, is not the corrected diaphragm value (T number) and is the diaphragm value that is not yet corrected (F number). The search interval determining unit 36 calculates a depth D of focus by using Equation (5) on the basis of the acquired information.

$$D=2\times F\times \delta \qquad (5)$$

Figure 8:
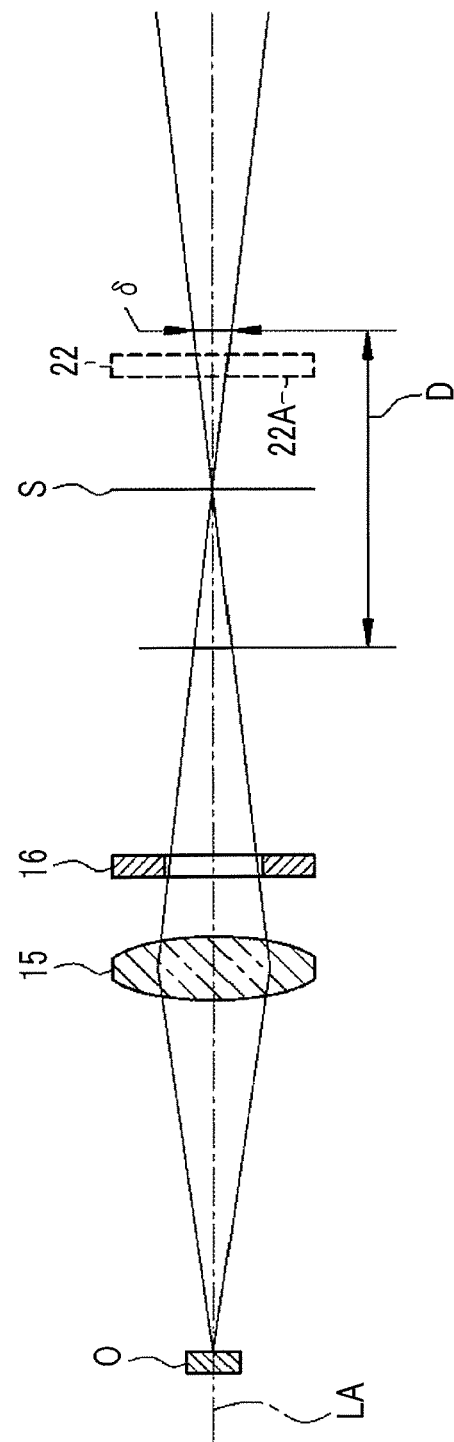
FIG. 8 is a view showing the dependency of the depth of focus on a diaphragm value.

As shown in FIG. 8, Equation (5) means that the depth D of focus is determined by an F number, which depends on the effective diaphragm diameter of the diaphragm 16 and the focal distance of the focus lens 15, and the diameter δ of the permissible circle of confusion. The depth D of focus is increased as the F number is increased (as an incident ray is narrowed down). In a case in which the imaging surface 22A is positioned within the depth D of focus which the image plane S is positioned in the middle thereof, the optical image of the subject O is focused on the imaging surface 22A and high-frequency components of the imaging signals output from the imaging element 22 are increased. For the purpose of description, the APD filter 17 is not shown in FIG. 8.

Figure 9:
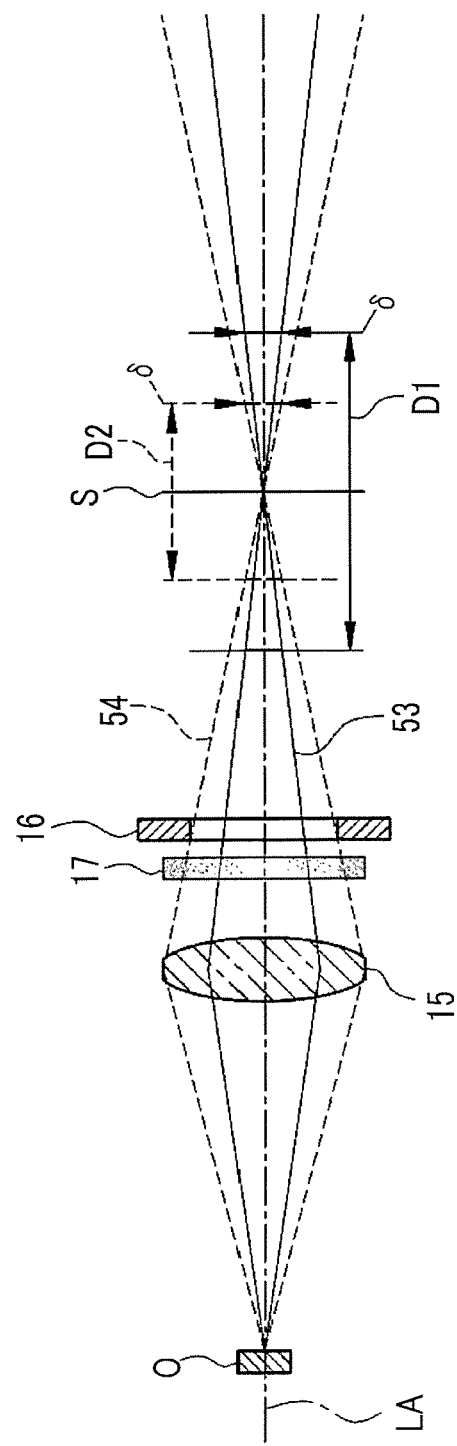
FIG. 9 is a view showing depths of focus calculated using a diaphragm value, which has been subjected to correction based on the optical characteristics of the APD filter, and a diaphragm value that is not yet subjected to correction based on the optical characteristics of the APD filter.

The calculation of the depth D of focus will be described with reference to FIG. 9. The depth D of focus is a parameter that is used for the determination of a search interval SD and determines the accuracy of detection of a focus position as described below.

An incident ray emitted from the subject O forms an image on the image plane S by the focus lens 15. In this case, a part of the incident ray is reduced by the APD filter 17. Light, which passes through the outer peripheral portion of the focus lens 15, of the incident ray having passed through the focus lens 15 is reduced by the APD filter 17. The corrected diaphragm value (T number) corresponds to a diaphragm value that is obtained in the event that the amount of the incident ray, which is obtained after the incident ray is reduced by the APD filter 17, is obtained in a case in which the APD filter 17 is not disposed. Light, which passes though the diaphragm 16 in the case of this diaphragm value, is called high-transmittance light 53, and light, which is blocked by the diaphragm 16 in the case of this diaphragm value, is called low-transmittance light 54.

According to Equation (5), a depth D1 of focus, which is calculated using the corrected diaphragm value (T number), is larger than a depth D2 of focus that is calculated using the diaphragm value (F number), which is not yet corrected. Since the depth D1 of focus corresponds to the depth of focus in the case of the high-transmittance light 53, a region in which the low-transmittance light 54 exceeds the diameter δ of the permissible circle of confusion and is not focused is present within the depth D1 of focus which the image plane S is positioned in the middle thereof. In this case, there is a concern that the resolution of focusing may be low and the low-transmittance light 54 may not be focused.

Since the depth D2 of focus is calculated in consideration of not only the high-transmittance light 53 but also the low-transmittance light 54, a region in which the low-transmittance light 54 is not focused is not present within the depth D2 of focus which the image plane S is positioned in the middle thereof. In the present invention, the diaphragm value (F number), which is not yet corrected, is used for the calculation of the depth D of focus to enhance the focusing accuracy by using all the light passing through the APD filter 17.

The search interval determining unit 36 acquires the information about the image plane movement coefficient k that is supplied from the ID information receiving unit 24. The search interval determining unit 36 determines a search interval SD by using Equation (6) on the basis of the information about the depth D of focus, which is calculated using the diaphragm value (F number), which is not yet corrected, and the image plane movement coefficient k.

$$SD=C\times D/k \qquad (6)$$

Here, C denotes a predetermined value, and it is preferable that C is in the range of 1 to 5. In a case in which C is smaller than 1, the accuracy of detection of a focus position is not much improved in comparison with a case in which C is 1 but there is a concern that time required for detecting a focus position may be increased. Further, in a case in which C is larger than 5, in comparison with a case in which C is 5 or less, there is a concern that an interpolation curve 65 (see FIG. 16) may not be appropriately obtained even though interpolation calculation processing to be described below is performed. In the first embodiment, C is set to 1.

The search interval determining unit 36 supplies the determined search interval SD to the focus position detecting unit 37 together with the information (depth-of-focus information) about the depth D of focus.

The focus position detecting unit 37 acquires the information (operation mode information) about an operation mode that is switched by the mode switching button 10B, and determines a focus search range L that is a range in which the focus position is searched on the basis of the operation mode information. The focus position detecting unit 37 acquires the search interval SD that is supplied from the search interval determining unit 36. The focus position detecting unit 37 determines a focusing evaluation position from the focus search range L and the search interval SD.

The focus position detecting unit 37 moves the focus lens 15 to each focusing evaluation position and acquires focusing evaluation values for every focusing evaluation position from the image processing unit 23. The focusing evaluation values are obtained by extracting high-frequency components from the imaging signals and integrating the high-frequency components.

Figure 10:
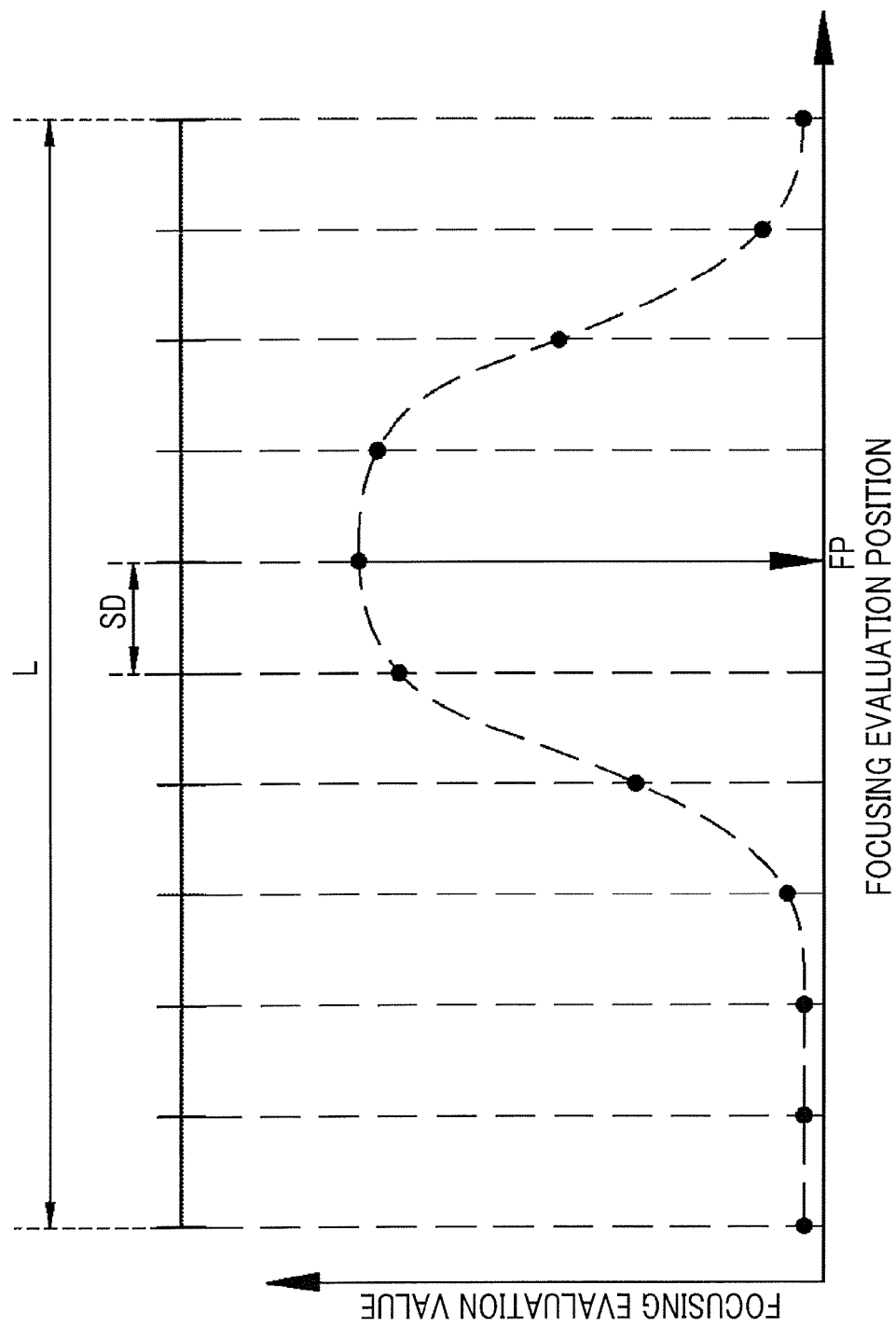
FIG. 10 is a view showing the detection of a focus position of the first embodiment.

As shown in FIG. 10, the focus position detecting unit 37 detects a focusing evaluation position, at which the maximum focusing evaluation value among the focusing evaluation values obtained for every focusing evaluation position is obtained, as a focus position FP. The focus position detecting unit 37 sets the focus lens 15 to the focus position FP.

After the focus position detecting unit 37 sets the focus lens 15 to the focus position FP, the focus position detecting unit 37 supplies the information (focus position information) about the focus position FP and the depth-of-focus information, which is supplied by the search interval determining unit 36, to the image processing unit 23.

The image processing unit 23 acquires the focus position information and the depth-of-focus information that are supplied from the focus position detecting unit 37. The image processing unit 23 acquires depth-of-field information by performing predetermined calculation processing on the depth-of-focus information. The image processing unit 23 supplies the focus position information and the depth-of-field information to the display unit 41 and the memory 42 together with the photographed image.

Figure 11:
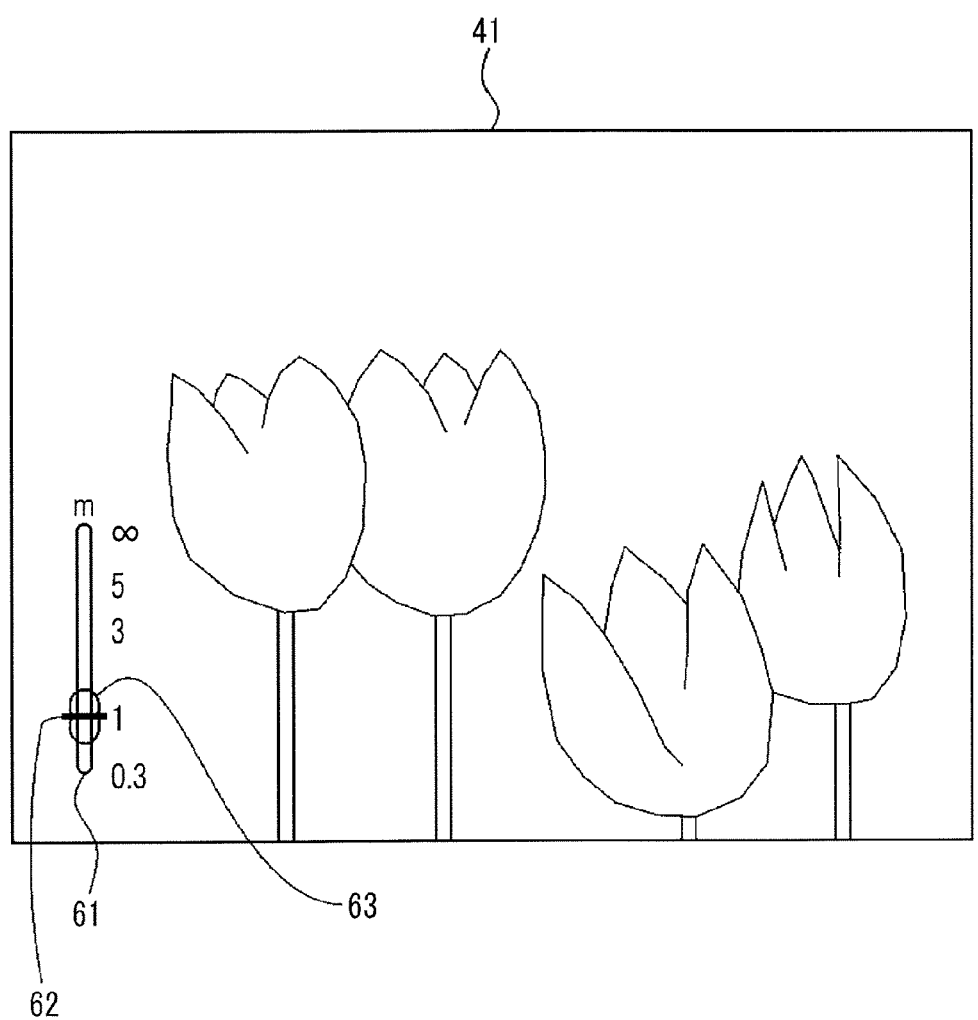
FIG. 11 is a view showing a distance display and the display of a focal distance range.

The display unit 41 superimposes and displays the focus position information and the depth-of-field information. As shown in FIG. 11, the focus position information is displayed as a distance display 62 in the distance display bar 61. In FIG. 11, "m" positioned above the distance display bar 61 and a numeral "1" positioned on the right side of the distance display 62 mean that a subject to be focused is distant from the imaging device 10 by a distance of 1 m. The depth-of-field information is information that represents a distance range in which focusing is performed, and is displayed as a focal distance range display 63 in the distance display bar 61.

The memory 42 stores the photographed image, which is supplied from the image processing unit 23, in association with the focus position information and the depth-of-field information that are supplied together.

Figure 12:
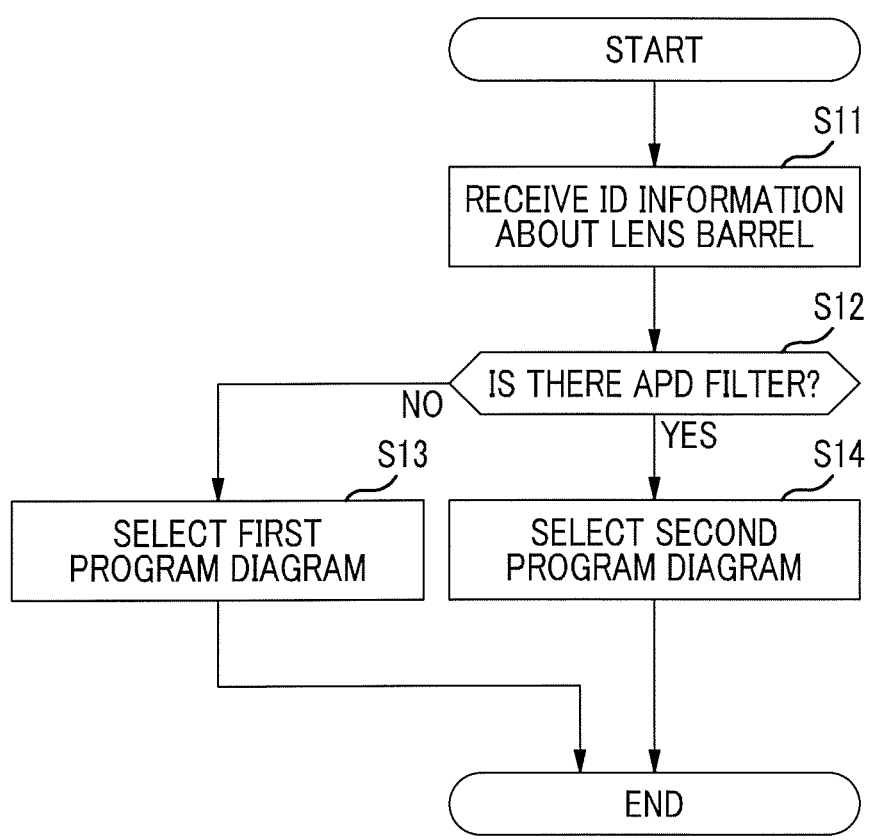
FIG. 12 is a flow chart for selecting a program diagram.

Next, the selection of a program diagram, which is used for the determination of an imaging exposure, will be described with reference to a flow chart shown in FIG. 12. The ID information receiving unit 24 receives ID information that is sent from the ID information storage unit 18 (Step S11), and determines whether or not the APD filter 17 is included in the lens barrel 12 from the received ID information (Step S12).

In a case in which it is determined that the APD filter 17 is not included in the lens barrel 12 (the determination of NO in Step S12), the ID information receiving unit 24 supplies filter presence/absence information that the APD filter 17 is not included in the lens barrel 12 to the imaging exposure determining unit 28. The imaging exposure determining unit 28 selects the first program diagram 50 from the program diagram storage unit 31 as a program diagram, which is used for the determination of an imaging exposure, on the basis of the filter presence/absence information (Step S13).

In a case in which it is determined that the APD filter 17 is included in the lens barrel 12 (the determination of YES in Step S12), the ID information receiving unit 24 supplies filter presence/absence information that the APD filter 17 is included in the lens barrel 12 to the imaging exposure determining unit 28.

The imaging exposure determining unit 28 selects the second program diagram 52 from the program diagram storage unit 31 as a program diagram, which is used for the determination of an imaging exposure, on the basis of the filter presence/absence information (Step S14)

Figure 13:
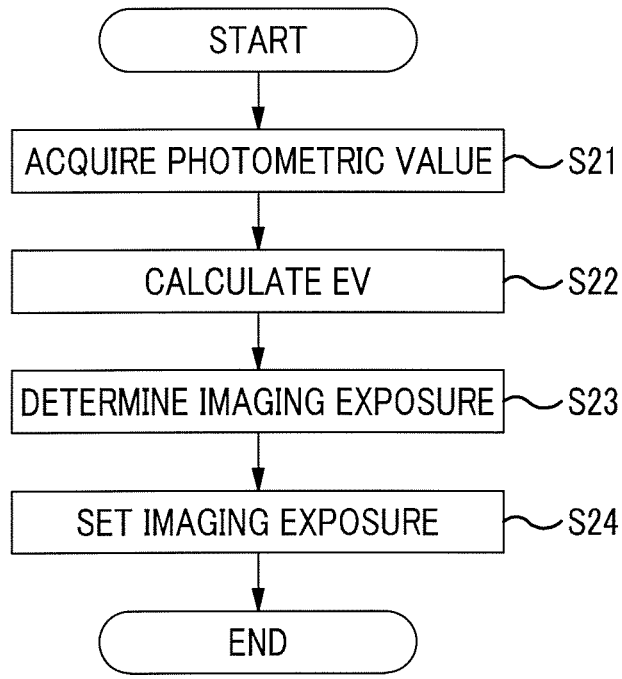
FIG. 13 is a flow chart for setting an imaging exposure.

Next, the setting of an imaging exposure, which is performed by the imaging device 10, will be described with reference to a flow chart shown in FIG. 13. In this case, the second program diagram 52 is selected as a program diagram, which is used for the determination of an imaging exposure, as described above.

The image processing unit 23 acquires brightness signals by performing processing, such as Y/C conversion, on the imaging signals that are input from the imaging element 22, and supplies the brightness signals to the exposure control section 25. The photometric unit 27 calculates a photometric value on the basis of the supplied brightness signals (Step S21), and supplies the calculated photometric value to the imaging exposure determining unit 28.

The imaging exposure determining unit 28 calculates appropriate EV by performing predetermined calculation on the basis of the photometric value that is supplied from the photometric unit 27 (Step S22). The imaging exposure determining unit 28 determines AV and TV, which correspond to the calculated EV, by using the selected second program diagram 52. That is, the imaging exposure determining unit 28 determines an imaging exposure (Step S23). The imaging exposure determining unit 28 supplies the determined AV and the determined TV to the imaging exposure setting unit 29.

The imaging exposure setting unit 29 sets the diaphragm 16 and sets the shutter speed of the imaging element 22 on the basis of the AV and the TV that are supplied from the imaging exposure determining unit 28 (Step S24)

Figure 14:
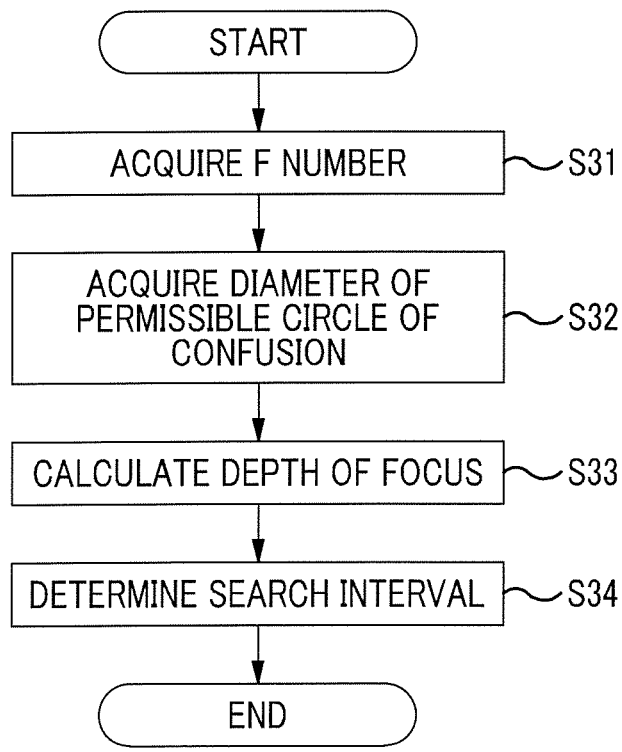
FIG. 14 is a flow chart for determining a search interval.

The determination of a search interval SD will be described with reference to a flow chart shown in FIG. 14. The search interval determining unit 36 acquires information about an imaging diaphragm value, which is set by the imaging exposure setting unit 29, from the imaging exposure setting unit 29. Here, the information about an imaging diaphragm value, which is acquired by the search interval determining unit 36, is not the corrected diaphragm value (T number) and is the diaphragm value (F number), which is not yet corrected (Step S31).

The search interval determining unit 36 acquires information about the diameter δ of the permissible circle of confusion from the memory 42 (Step S32). The search interval determining unit 36 calculates the depth D of focus by using the above-mentioned equation (5) on the basis of the diaphragm value (F number), which is not yet corrected, and the diameter δ of the permissible circle of confusion (Step S33).

The search interval determining unit 36 acquires the information about the image plane movement coefficient k from the ID information receiving unit 24. The search interval determining unit 36 calculates a search interval SD by using the above-mentioned equation (6) on the basis of the image plane movement coefficient k and the calculated depth D of focus, and determines the search interval SD (Step S34).

Figure 15:
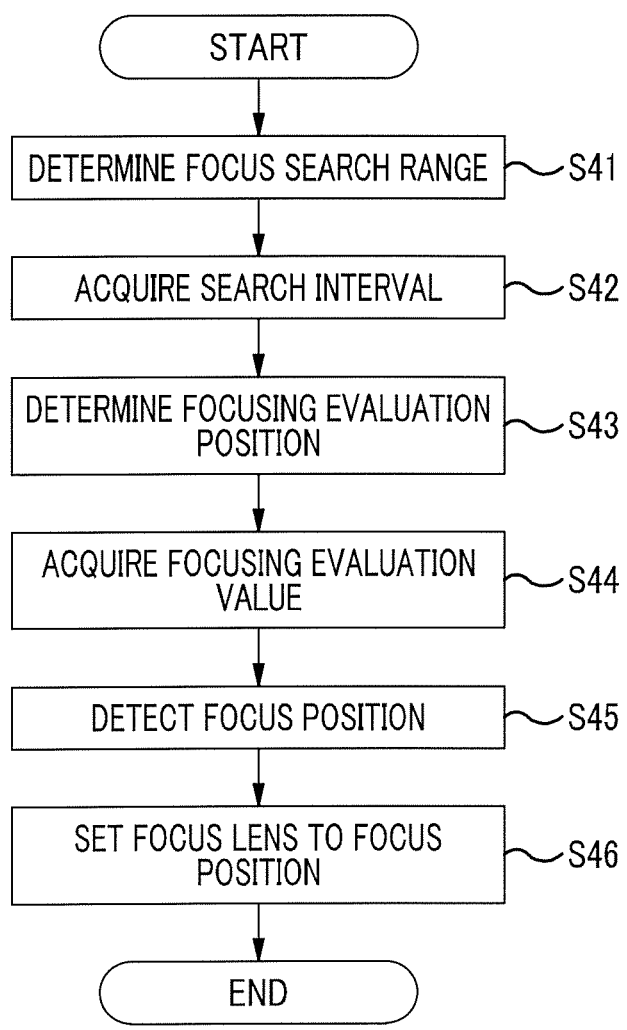
FIG. 15 is a flow chart for detecting a focus position of the first embodiment.

The detection of a focus position will be described with reference to a flow chart shown in FIG. 15. The focus position detecting unit 37 acquires operation mode information, and determines a focus search range L on the basis of the operation mode information (Step S41). The focus position detecting unit 37 acquires the search interval SD that is determined by the search interval determining unit 36 as described above (Step S42). The focus position detecting unit 37 determines a focusing evaluation position on the basis of the focus search range L and the search interval SD (Step S43).

The focus position detecting unit 37 moves the focus lens 15 to each focusing evaluation position and acquires focusing evaluation values for every focusing evaluation position from the image processing unit 23 (Step S44). The focus position detecting unit 37 detects a focusing evaluation position, at which the maximum focusing evaluation value is obtained, as a focus position FP (Step S45). The focus position detecting unit 37 sets the focus lens 15 to the focus position FP (Step S46).

A so-called climbing detection method is actually used for the detection of a focus position. The climbing detection method is a method that acquires focusing evaluation values while changing focusing evaluation positions from one end of the focus search range L one by one and ends a focus detecting operation at the time of the detection of the maximum value (peak value) of the focusing evaluation values. For this reason, in the climbing detection method, focusing evaluation values do not need to be acquired at all the focusing evaluation positions in the focus search range L. Accordingly, the detection speed of a focus position is improved.

After an imaging exposure and a focus position are set in this way, an imaging operation is performed by the imaging element 22 and imaging signals are output. A photographed image is created from the imaging signals by the image processing unit 23. Further, the image processing unit 23 acquires the focus position information and the depth-of-focus information, which are supplied from the focus position detecting unit 37 at the time of the setting of a focus position, and calculates depth-of-field information from the depth-of-focus information. The focus position information and the depth-of-field information are supplied to the display unit 41 and the memory 42 from the image processing unit 23 together with the photographed image.

The display unit 41 superimposes and displays the distance display bar 61, the distance display 62, and the focal distance range display 63, which are created from the focus position information and the depth-of-field information, on the photographed image. The memory 42 stores the photographed image in association with the focus position information and the depth-of-field information.

Since the correction of a diaphragm value, which is based on the optical characteristics of the APD filter 17, is correction that is performed in consideration of light transmittance P, the correction of a diaphragm value, which is based on the optical characteristics of the APD filter 17, is effective for the determination of an imaging exposure based on an exposure value EV but is not effective for the calculation of the depth of focus that is used for the determination of a search interval SD. Accordingly, in the present invention, the corrected diaphragm value (T number) is used at the time of the setting of an imaging exposure but the corrected diaphragm value (T number) is not used and the diaphragm value (F number), which is not yet corrected, is used at the time of the detection of a focus position. For this reason, it is possible to accurately perform the determination of an imaging exposure and the detection of a focus position together.

A method, which sets a diaphragm value to a value smaller than the diaphragm value set at the time of an imaging operation and shortens the depth of focus to detect a focus position, is also considered to improve the accuracy of detection of a focus position. In this case, there is a concern that the deviation of a focus position caused by the change of the setting of the diaphragm 16 may occur due to the characteristics of the focus lens 15 in the case of the detection of a focus position and the case of an imaging operation. Further, since the characteristics (an individual difference) of the focus lens 15 or a temperature condition at the time of an imaging operation is changed, it is difficult to completely correct the deviation of the focus position. For this reason, for the improvement of the accuracy of detection of a focus position, it is not preferable to set a diaphragm value to a value smaller than the diaphragm value set at the time of an imaging operation to detect a focus position and it is preferable to detect a focus position with a diaphragm that is set at the time of an imaging operation as described in the first embodiment. Since the diaphragm, which is set at the time of an imaging operation, is an imaging diaphragm that is set by the setting of an imaging exposure, it is preferable that a focus position is detected using a diaphragm value (F number), which is not yet corrected, with an imaging diaphragm that is set in the setting of an imaging exposure after an imaging diaphragm is set using the corrected diaphragm value (T number) in the setting of the imaging exposure.

In the first embodiment, whether or not the APD filter 17 is disposed on the light path is switched by the selection of the lens barrel that is to be mounted on the imaging device body 11. However, the present invention is not limited to this aspect. For example, an APD filter moving unit for freely moving the APD filter 17 may be provided in the lens barrel, and the APD filter 17 may be disposed on or removed from the optical axis LA by the APD filter moving unit. In this case, an APD filter position detector for detecting the position of the APD filter 17 is provided and the disposition/removal of the APD filter 17 (the switching of the presence/absence of the APD filter on the light path) is detected by the APD filter position detector.

The present invention can also be applied to an imaging device of which an APD filter 17 is fixedly disposed on a light path, that is, an imaging device in which whether or not an APD filter 17 is disposed cannot be switched while the APD filter 17 is disposed.

Further, the lens barrel 12 has included the APD filter 17 having the optical characteristics shown in FIG. 3 in the first embodiment. However, the optical characteristics are illustrative and the lens barrel 12 may include an APD filter having optical characteristics different from the optical characteristics of the APD filter 17. In addition, lens barrels including APD filters having different optical characteristics may be connected to the imaging device body 11. In this case, second program diagrams corresponding to the optical characteristics of the respective APD filters are stored in the program diagram storage unit 31 of the imaging device body 11, and may be selected according to the type of the APD filter.

Furthermore, the program diagram storage unit 31 has been provided in the imaging device body 11 in the first embodiment, but the program diagram storage unit may be provided in the lens barrel 12. In this case, the imaging device body 11 acquires a program diagram, which corresponds to the optical characteristics of the APD filter built in the lens barrel 12, from the lens barrel 12. Accordingly, since program diagrams corresponding to the optical characteristics of a plurality of APD filters do not need to be stored in the imaging device body, the configuration of the imaging device body is simplified.

Further, the first program diagram 50 shown in FIG. 6 has been used in the first embodiment. However, the first program diagram may be another multiple-stage diaphragm type program diagram or a linear diaphragm type program diagram. The second program diagram may be made using a diaphragm value (T number), which is corrected on the basis of the optical characteristics of the APD filter 17, as the diaphragm value (F number) of the first program diagram.

Furthermore, a program diagram including a portion in which a plurality of sets of AVs and TVs correspond to one exposure value EV may be used as the first program diagram, and the first program diagram may suppress a change in AV that depends on a change in EV. In this case, since a change in the depth of focus is suppressed, a focus position is efficiently detected, particularly, in a case in which a repeated focus position is to be detected.

Second Embodiment

The predetermined value C has been set to 1 in the first embodiment. This corresponds to the fact that the image-plane moving distance corresponding to a search interval SD corresponds to the depth of focus. Accordingly, in the first embodiment, an accurate focus position is necessarily detected at one of the focusing evaluation positions set in the focus search range L. In a second embodiment, the predetermined value C is set to 2 or more so that a search interval is increased. Accordingly, the focusing evaluation positions of the first embodiment are thinned out, and the focusing evaluation values at the focusing evaluation positions, which have been thinned out, are obtained by interpolation calculation. As a result, the speed of a focus detecting operation is further increased. Since other configuration of the second embodiment is the same as that of the first embodiment, the detailed description thereof will be omitted.

Figure 16:
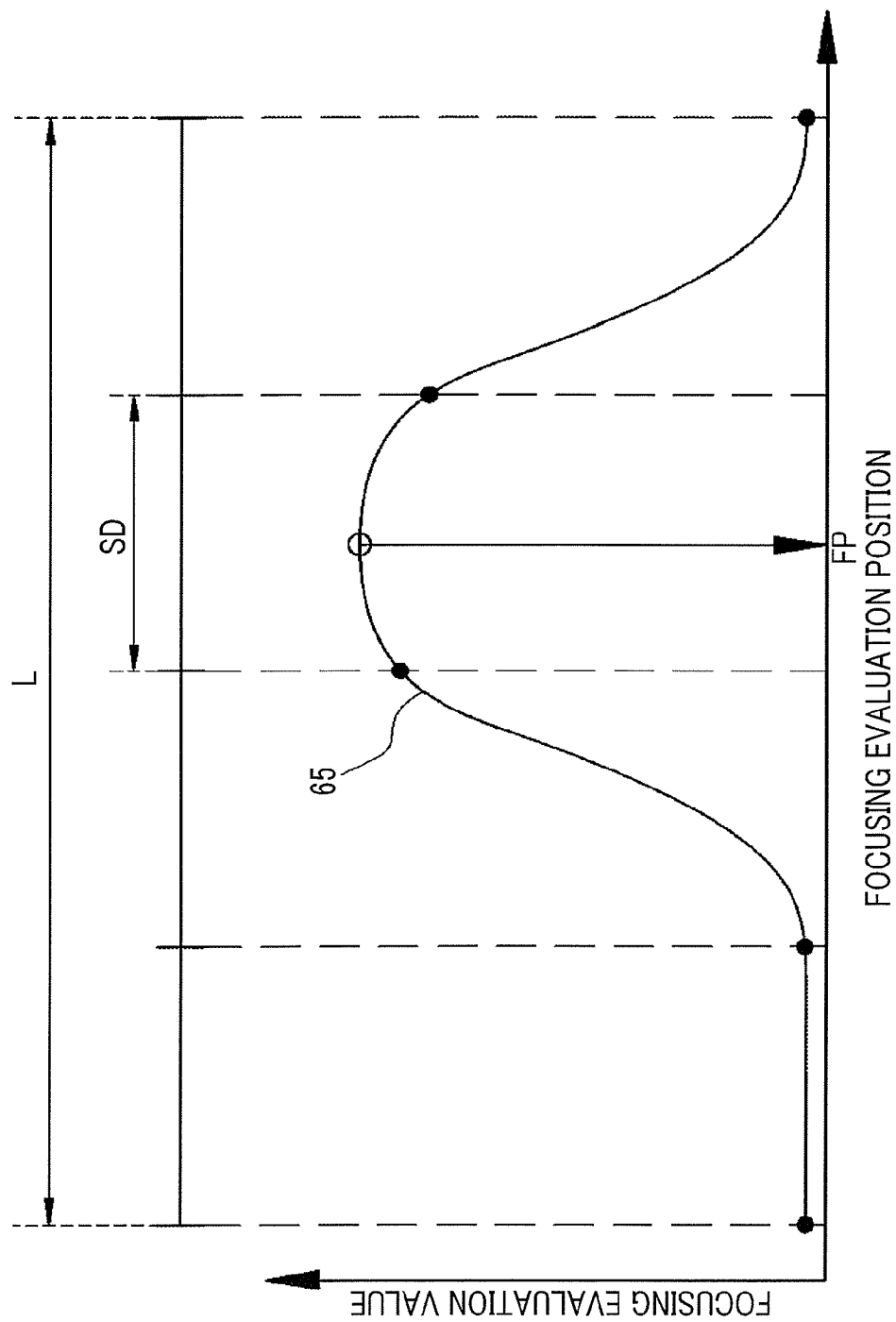
FIG. 16 is a view showing the detection of a focus position of a second embodiment.
Figure 17:
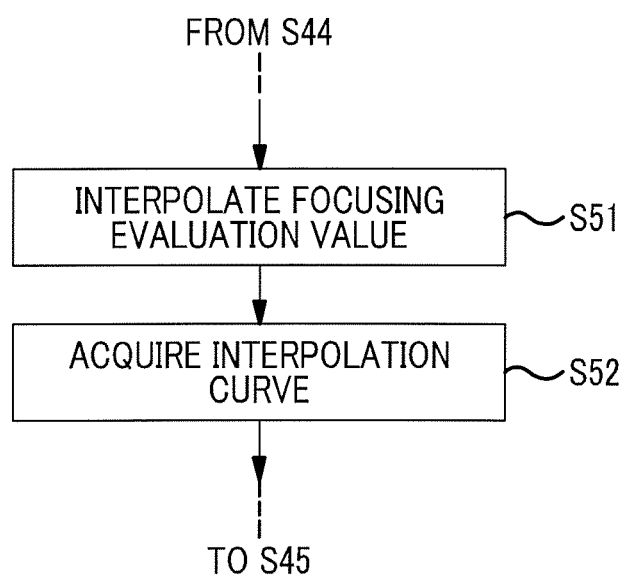
FIG. 17 is a flow chart for detecting a focus position of the second embodiment.

The focus detecting operation of the second embodiment will be described with reference to a flow chart shown in FIGS. 16 and 17. The focus position detecting unit 37 acquires focusing evaluation values (Step S44), and then performs interpolation calculation on the basis of the obtained focusing evaluation values (Step S51). Publicly known interpolation calculation, such as linear interpolation or spline interpolation, is performed as the interpolation calculation. Accordingly, the focus position detecting unit 37 acquires an interpolation curve 65 (Step S52). The focus position detecting unit 37 detects a focusing evaluation position, at which the maximum focusing evaluation value is obtained, on the interpolation curve 65 as a focus position FP (Step S45). A climbing detection method is used even in the second embodiment as in the first embodiment.

In the second embodiment, the number of times of acquisition of a focusing evaluation value is further reduced since the predetermined value C is set to be larger than that of the first embodiment so that a search interval is increased. Accordingly, the detection speed of a focus position is further improved.

Examples of the lens barrel-interchangeable imaging device have been described in the embodiments, but the present invention can also be applied to not a lens-interchangeable imaging device but an integrated imaging device, a mobile phone with a camera, and a smartphone.

EXPLANATION OF REFERENCES

10: imaging device
11: imaging device body
12: lens barrel
15: focus lens
16: diaphragm
17: APD filter
22: imaging element
26: focusing control section
36: search interval determining unit
37: focus position detecting unit

What is claimed is:

1. An imaging device comprising:
a focus lens;
an imaging element that photoelectrically converts an incident ray entering through the focus lens and outputs an imaging signal;
a diaphragm that changes the amount of the incident ray;
a photometric unit that performs photometry on the basis of the imaging signal;
an apodization filter that is disposed on a light path of the incident ray;
an imaging exposure determining unit that determines an imaging exposure on the basis of a photometric value obtained from the photometric unit and determines the imaging exposure by using a corrected diaphragm value which is obtained by correcting a diaphragm value on the basis of optical characteristics of the apodization filter;
a focus position detecting unit that moves the focus lens by search intervals and detects a focus position by calculating a focusing evaluation value for each search interval on the basis of the imaging signal; and
a search interval determining unit that determines the search interval on the basis of a depth of focus depending on the diaphragm value, and determines the search interval by using a diaphragm value, which is not yet corrected.

2. The imaging device according to claim 1, further comprising:
a display unit that displays a distance range, in which focusing is performed, on the basis of the focus position and the depth of focus.

3. The imaging device according to claim 1,
wherein the depth of focus depends on a diaphragm value and a diameter of a permissible circle of confusion that is determined depending on characteristics of the imaging element.

4. The imaging device according to claim 3,
wherein the search interval determining unit determines the search interval on the basis of a condition in which a moving distance of an image plane depending on the movement of the focus lens corresponds to a value obtained by multiplying the depth of focus by a predetermined value.

5. The imaging device according to claim 4,
wherein the predetermined value is 1.

6. The imaging device according to claim 4,
wherein the predetermined value is larger than 1, and
the focus position detecting unit detects the focus position by performing interpolation calculation on the basis of the focusing evaluation value.

7. An imaging device comprising:
a focus lens;
an imaging element that photoelectrically converts an incident ray entering through the focus lens and outputs an imaging signal;
a diaphragm that changes the amount of the incident ray;
a photometric unit that performs photometry on the basis of the imaging signal;
an apodization filter that is disposed on a light path of the incident ray;
an imaging exposure determining unit that determines an imaging exposure on the basis of a photometric value obtained from the photometric unit and determines the imaging exposure by using a corrected diaphragm value, which is obtained by correcting a diaphragm value on the basis of optical characteristics of the apodization filter, in a case in which the apodization filter is disposed;
a focus position detecting unit that moves the focus lens by search intervals and detects a focus position by calculating a focusing evaluation value for each search interval on the basis of the imaging signal; and
a search interval determining unit that determines the search interval on the basis of a depth of focus depending on the diaphragm value, and determines the search interval by using a diaphragm value, which is not yet corrected, in a case in which the apodization filter is disposed.

8. The imaging device according to claim 7, further comprising:

a filter detecting unit that detects whether or not the apodization filter is disposed on the light path, wherein the imaging exposure determining unit determines whether or not to correct the diaphragm value on the basis of a detection result of the filter detecting unit.

9. An imaging device body comprising:

a lens barrel mounting portion on which a lens barrel including a focus lens, a diaphragm, and an apodization filter is mounted;

an imaging element that photoelectrically converts an incident ray entering from the lens barrel and outputs an imaging signal;

a photometric unit that performs photometry on the basis of the imaging signal;

an imaging exposure determining unit that determines an imaging exposure on the basis of a photometric value obtained from the photometric unit and determines the imaging exposure by using a corrected diaphragm value, which is obtained by correcting a diaphragm value on the basis of optical characteristics of the apodization filter, in a case in which the mounting of the lens barrel including the apodization filter is detected;

a focus position detecting unit that moves the focus lens by search intervals and detects a focus position by calculating a focusing evaluation value for each search interval on the basis of the imaging signal; and a search interval determining unit that determines the search interval on the basis of a depth of focus depending on the diaphragm value, and determines the search interval by using a diaphragm value, which is not yet corrected.

10. The imaging device body according to claim 9, wherein the optical characteristics are stored in the lens barrel, and the imaging exposure determining unit acquires the optical characteristics from the lens barrel and corrects the diaphragm value.

11. The imaging device body according to claim 10, wherein the search interval determining unit determines the search interval on the basis of a condition in which a moving distance of an image plane depending on the movement of the focus lens corresponds to a value obtained by multiplying the depth of focus by a predetermined value, and acquires a moving magnification of the image plane to the movement of the focus lens from the lens barrel and determines the search interval.

12. An imaging device body comprising:

a lens barrel mounting portion on which a lens barrel including a focus lens, a diaphragm, and an apodization filter is detachably mounted;

an imaging element that photoelectrically converts an incident ray entering from the lens barrel and outputs an imaging signal;

a photometric unit that performs photometry on the basis of the imaging signal;

an imaging exposure determining unit that determines an imaging exposure on the basis of a photometric value obtained from the photometric unit and determines the imaging exposure by using a corrected diaphragm value, which is obtained by correcting a diaphragm value on the basis of optical characteristics of the apodization filter, in a case in which the apodization filter is disposed;

a focus position detecting unit that moves the focus lens by search intervals and detects a focus position by calculating a focusing evaluation value for each search interval on the basis of the imaging signal; and a search interval determining unit that determines the search interval on the basis of a depth of focus depending on the diaphragm value, and determines the search interval by using a diaphragm value, which is not yet corrected, in a case in which the apodization filter is disposed.

13. A lens barrel comprising:

a focus lens;

a diaphragm that changes the amount of an incident ray;

an apodization filter that is disposed on a light path of the incident ray; and a base end portion that is mounted on an imaging device body including an imaging element, a photometric unit, an imaging exposure determining unit, a focus position detecting unit, and a search interval determining unit, the imaging element photoelectrically converting the incident ray and outputting an imaging signal, the photometric unit performing photometry on the basis of the imaging signal, the imaging exposure determining unit determining an imaging exposure on the basis of a photometric value obtained from the photometric unit and determining the imaging exposure by using a corrected diaphragm value obtained by correcting a diaphragm value on the basis of optical characteristics of the apodization filter, the focus position detecting unit moving the focus lens by search intervals and detecting a focus position by calculating a focusing evaluation value for each search interval on the basis of the imaging signal, and the search interval determining unit determining the search interval on the basis of a depth of focus depending on the diaphragm value, and determining the search interval by using a diaphragm value, which is not yet corrected.

14. A lens barrel comprising:

a focus lens;

a diaphragm that changes the amount of an incident ray;

an apodization filter that is disposed on a light path of the incident ray; and a base end portion that is detachably mounted on an imaging device body including an imaging element, a photometric unit, an imaging exposure determining unit, a focus position detecting unit, and a search interval determining unit, the imaging element photoelectrically converting the incident ray and outputting an imaging signal, the photometric unit performing photometry on the basis of the imaging signal, the imaging exposure determining unit determining an imaging exposure on the basis of a photometric value obtained from the photometric unit and determining the imaging exposure by using a corrected diaphragm value obtained by correcting a diaphragm value on the basis of optical characteristics of the apodization filter in a case in which the mounting of the lens barrel including the apodization filter is detected, the focus position detecting unit moving the focus lens by search intervals and detecting a focus position by calculating a focusing evaluation value for each search interval on the basis of the imaging signal, and the search interval determining unit determining the search interval on the basis of a depth of focus depending on the diaphragm value, and determining the search interval by using a diaphragm value, which is not yet corrected.

* * * * *